(12) United States Patent
Esteban et al.

(10) Patent No.: US 10,928,302 B2
(45) Date of Patent: Feb. 23, 2021

(54) ANALYSIS SYSTEM INCLUDING A CONFINEMENT DEVICE WITH VARIABLE-SIZE MEASUREMENT CHAMBER PARTIALLY DELIMITED BY A FLEXIBLE MEMBRANE

(71) Applicant: IPRATECH SA, Mons (BE)

(72) Inventors: Geoffrey Esteban, Teyran (FR); Jérémie Cubeta, Le Roeulx (BE); David Sergeant, Ecaussines (BE); Thierry Poskin, Obaix (BE)

(73) Assignee: IPRATECH SA, Mons (BE)

( * ) Notice: Subject to any disclaimer, the term of this patent is extended or adjusted under 35 U.S.C. 154(b) by 124 days.

(21) Appl. No.: 16/098,661

(22) PCT Filed: May 2, 2017

(86) PCT No.: PCT/EP2017/060328
§ 371 (c)(1),
(2) Date: Nov. 2, 2018

(87) PCT Pub. No.: WO2017/191087
PCT Pub. Date: Nov. 9, 2017

(65) Prior Publication Data
US 2019/0145886 A1    May 16, 2019

(30) Foreign Application Priority Data
May 4, 2016   (FR) ........................................ 1654053

(51) Int. Cl.
*G01N 21/03*    (2006.01)
*G01N 21/47*    (2006.01)
*G03H 1/04*    (2006.01)

(52) U.S. Cl.
CPC ......... *G01N 21/03* (2013.01); *G01N 21/4788* (2013.01); *G01N 2021/0364* (2013.01); *G03H 2001/0447* (2013.01)

(58) Field of Classification Search
CPC ........... G01N 2021/0364; G01N 21/03; G01N 21/0303; G01N 21/4788; G03H 2001/0447
See application file for complete search history.

(56) References Cited

U.S. PATENT DOCUMENTS 2,819,402 A  *  1/1958  Bresky ................... G02B 7/007
                                                  250/428
3,679,315 A      7/1972  Laucournet et al.
(Continued)

FOREIGN PATENT DOCUMENTS

| GB | 1054813 | 1/1967 |
|---|---|---|
| WO | WO2011/107102 | 9/2011 |
| WO | WO2012/119880 | 9/2012 |

*Primary Examiner* — Hina F Ayub
*Assistant Examiner* — Amanda Merlino
(74) *Attorney, Agent, or Firm* — Occhiuti & Rohlicek LLP

(57) ABSTRACT

An analysis system features a confinement device, an optical measurement device, a flow device, a collecting conduit, and an actuation device. The confinement device comprises a measurement chamber, optically transparent first and second measurement surfaces that face each other across a distance that defines a thickness of the measurement chamber, and a flexible membrane that forms a seal with the measurement surfaces to laterally delimit the measurement chamber. When the collecting is sealed with a container, a connection is established that permits a liquid sample to be collected from the container. The optical measurement device emits light towards the chamber and detects light that has been transmitted through it, wherein the flow device causes liquid to flow through the collecting conduit between the container (Continued)

and the measurement chamber. The actuation device varies the thickness.

16 Claims, 5 Drawing Sheets

(56) References Cited

U.S. PATENT DOCUMENTS

| | | |
|---|---|---|
| 5,750,998 A | 5/1998 | Goldman |
| 2007/0207551 A1 | 9/2007 | Glenbjerg |
| 2013/0333453 A1 | 12/2013 | Platte et al. |
| 2016/0091414 A1 | 3/2016 | Platter et al. |

* cited by examiner

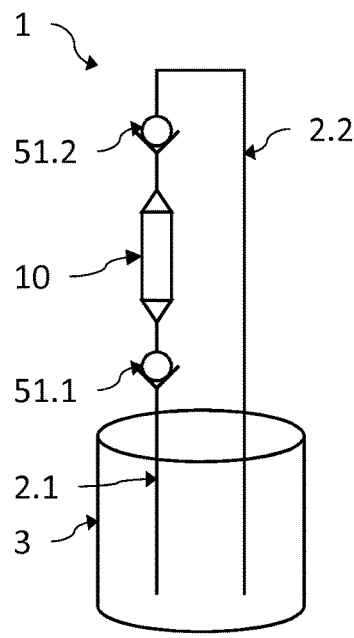
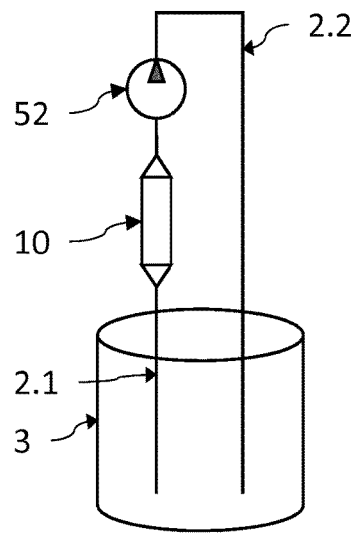
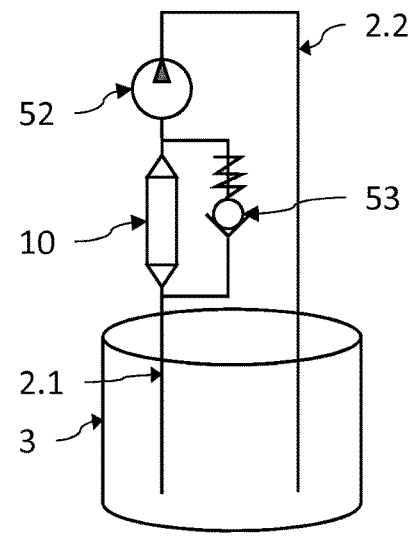
Fig.5A        Fig.5B        Fig.5C
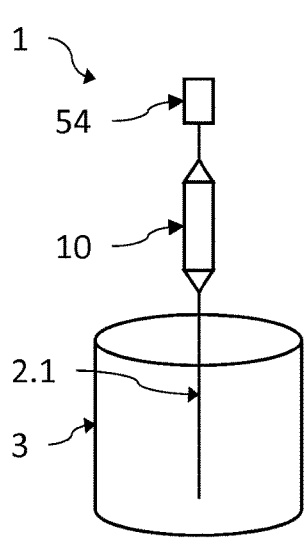
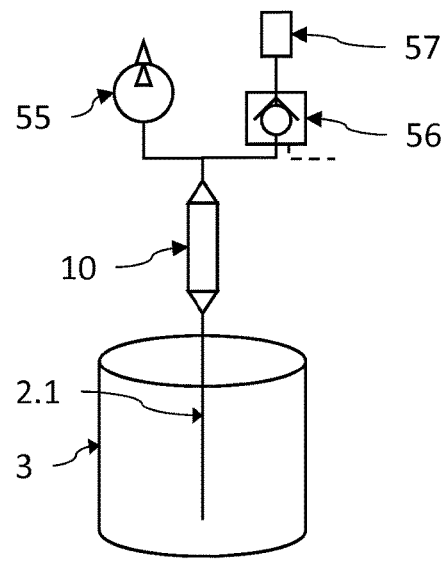
Fig.5D        Fig.5E

ANALYSIS SYSTEM INCLUDING A CONFINEMENT DEVICE WITH VARIABLE-SIZE MEASUREMENT CHAMBER PARTIALLY DELIMITED BY A FLEXIBLE MEMBRANE

RELATED APPLICATIONS

This is the national stage of international application PCT/EP2017/060328, filed on May 2, 2017, which claims the benefit of the May 4, 2016 priority date of French application 1654053 the contents of which are herein incorporated by reference.

FIELD OF INVENTION

The invention relates to analysis of a liquid that may contain analytes that are possibly biological, the liquid being present in a container such as a bioreactor, tank or conduit. In particular, the, the invention relates to a confinement device and an analysis system including a confinement device that permits in-line analysis of the liquid and that is usable for evaluating the concentration of biological cells and for discriminating living cells from dead ones.

BACKGROUND

In various industrial fields, such as the chemical, pharmaceutical and food industries, it is necessary to use measurement devices to measure various physical properties of a liquid held in a container. Examples of such properties include temperature, the pH, oxygen and $CO_2$ levels, conductivity, turbidity, or other properties. Examples of a container include a bioreactor, a tank or a conduit. It may also be necessary to analyze analytes present in the liquid, such as biological cells.

In some cases, it is desirable monitor the cell culture of a bioreactor in real time. One way to do so is to use immersion probes for evaluating the concentration of cells in a liquid sample present at a measurement site of the probe. One way to do this is by measuring absorption of light emitted toward the liquid sample.

In optical measurement, it may be useful to fix the dimensions of the liquid sample to be analyzed. Doing so can improve the resolution and robustness of the optical measurement or make it possible to count the living cells in the liquid sample.

SUMMARY OF THE INVENTION

There exists a need for an analysis system including a confinement device that permits the analysis of a liquid contained in a container, preferably on an in-line basis, without requiring the immersion of a confinement device in the container while allowing the renewal of the liquid present in the measurement chamber.

The invention relates to a confinement device and an analysis system for the analysis of a sample of a liquid present in a container, preferably on an in-line basis, which is to say that the liquid sample may be reintroduced into the container after analysis. The liquid sample may be a portion of a liquid capable of containing analytes such as biological cells. Thus the container may be a bioreactor, a tank, a conduit or another vessel. The container may be made of a polymer material, plastic for example, 316L stainless steel, glass or other suitable material. It may be a single-use container.

The analysis of the sample includes measuring and evaluating one or more parameters representative of the liquid sample. These parameters may originate from physical properties of the liquid sample, such as the rate of absorption of incident light radiation, the colorimetry, one or more interference patterns, or others. Thus the analysis may consist of detecting and evaluating the presence, the concentration and/or the type of analytes present in the liquid sample, for example biological particles such as cells, bacteria or others. In the case of cell culture in a bioreactor, the confinement device may be used, notably, to measure the cell concentration and to discriminate between living and dead cells by an optical measurement technique using lens-free imaging to determine cell viability.

The confinement device includes a measurement chamber capable of receiving the liquid sample the thickness of which may vary over time. The measurement chamber interacts with an optical measurement device and with an actuation device for varying the thickness of the measurement chamber. It may also include a flow device to provide the flow of the liquid between the container and the measurement chamber. All of these devices form an analysis system in which the measurement chamber is intended to be placed outside the container and to be connected to the latter in a sealed, and preferably sterile, way.

In one aspect, the invention features an analysis system that includes a confinement device for a liquid sample to be analyzed, including a measurement chamber capable of receiving the liquid sample and delimited at least partially by a first and a second surfaces, called the "measurement surfaces." The measurement surfaces are transparent to light, or "measurement radiation," and face one another so that a distance between the measurement surfaces defines a thickness of the measurement chamber; at least a first measurement surface being movable relative to the second measurement surface, so as to permit a variation of the thickness of the measurement chamber. The measurement chamber is also delimited laterally by a flexible membrane fastened in a sealed way to the measurement surfaces, allowing the variation in the thickness of the measurement chamber.

The confinement device also includes at least one collecting conduit in fluid communication with the measurement chamber and intended to be connected in a sealed way to a container so as to be able to collect the liquid sample from the container. The analysis system also includes an optical measurement device capable of emitting measurement light radiation toward the measurement chamber, and of detecting light radiation transmitted through the measurement chamber, the latter having a thickness equal to a minimum value ($e_{mes}$) called the measurement value, and a flow device capable of causing at least the flow of liquid in the collecting conduit from the container to the measurement chamber.

According to the invention, the analysis system also includes an actuation device capable of providing a relative movement of the measurement surfaces relative to one another, resulting in a variation of the thickness of the measurement chamber, and thus a separation of the two measurement surfaces from one another so as to permit renewal of the liquid present in the measurement chamber, the thickness of the measurement chamber being equal to a maximum value called the renewal value, this being greater than the minimum measurement value.

Some preferred, but non-limiting, features of this analysis system are as follows.

The actuation device may be capable of providing a relative separation of the measurement surfaces, from a position called the position of being brought toward one another, in which a thickness of the measurement chamber is equal to the minimum value called the measurement value, to a separated position called the renewal position, in which the thickness of the measurement chamber is equal to the maximum renewal value, and then bringing the measurement surfaces toward one another, from the separated renewal position to the position in which they are brought toward one another.

The maximum renewal value may be such that the volume of liquid contained in the measurement chamber is then at least ten times greater than the volume of liquid contained in the measurement chamber when the thickness of the latter has the minimum measurement value.

The maximum renewal value may be such that the volume of liquid contained in the measurement chamber and in the collecting conduit is then at least ten times greater than the volume of liquid contained in the measurement chamber and in the collecting conduit during the optical measurement step when the thickness of the latter has the minimum measurement value.

The confinement device may include two rigid plates, an inner face of each of these plates forming one of the measurement surfaces, the flexible membrane being fastened to the edge of each rigid plate by a fastening portion.

Each fastening portion may be fastened to a rigid plate at an outer face, opposed to the corresponding measurement surface and/or to a lateral face of the rigid plate.

The fastening portions and the flexible membrane may be made in one piece and from the same material.

The confinement device may comprise a fluid connection portion including an inlet conduit connectable to the collecting conduit and having transverse dimensions which are substantially constant during a variation of the thickness of the measurement chamber, and an intermediate portion providing a fluid connection and mechanical joint between the inlet conduit and the measurement chamber.

The optical measurement device may include a light source positioned facing the first measurement surface and a photodetector positioned facing the second measurement surface. The light source may be positioned at a distance greater than or equal to one centimeter from the first measurement surface, and/or the photodetector is positioned at a distance less than or equal to one centimeter from the second measurement surface.

The actuation device may include a movement member capable of moving at least one measurement surface along an axis substantially orthogonal to the measurement surfaces, and an actuator capable of moving the movement member, so as to provide a variation in the thickness of the measurement chamber.

At least one stop member may be positioned on the first and/or the second measurement surface so as to form a stop between the two measurement surfaces, and/or in the actuation device so as to limit the movement of the movement member, thus defining a minimum thickness of the measurement chamber, this minimum thickness being less than or equal to five hundred micrometers, and preferably less than or equal to three hundred micrometers.

The flow device may include the confinement device associated with the actuation device, so that increasing the thickness of the measurement chamber causes liquid to flow in the collecting conduit from the container to the measurement chamber. The flow device may include at least one check valve connected in series with the measurement chamber, for example two check valves connected on either side of the measurement chamber, so that the liquid flows in the same direction during the bringing closer and separation phases of the measurement surfaces. The measurement chamber is then connected to a collecting conduit and to a discharge conduit. The flow device may include a bypass valve connected in parallel with the measurement chamber, the bypass valve having an opening threshold such that the bypass valve is open when the measurement chamber has a minimum measurement thickness and the bypass valve is closed when the chamber has a thickness greater than the minimum measurement value. The flow device may include a hydraulic pump connected in series with the measurement chamber so as to cause the flow of the liquid. The flow device may include the confinement device associated with the actuation device, the measurement chamber being connected to a single conduit for collecting and discharging the liquid, intended to communication with the container.

The invention also relates to a method for analyzing a liquid sample present in an analysis system according to any of the preceding characteristic. Such a method includes introducing a liquid sample into the measurement chamber from a container; optically measuring at least one property relating to the liquid sample present in the measurement chamber, the thickness of the measurement chamber being equal to a minimum value called the measurement value; and separating two measurement surfaces from one another so as to permit renewal of the liquid present in the measurement chamber, the thickness of the measurement chamber being equal to a maximum value, called the "renewal value," this value being greater than the minimum measurement value.

The method may include a plurality of successive measurement steps, at least one sequence of a separation step followed by a step of bringing the two measurement surfaces toward one another being executed between two successive optical measurement steps, so that the thickness of the measurement chamber increases from the minimum measurement value to at least the maximum value, then decreases to the minimum measurement value.

The method may include a preliminary step of a sealed, and preferably sterile, connection of the fluid collecting conduit to the container.

The maximum renewal value may be such that the volume of liquid contained in the measurement chamber in the separation step is at least ten times greater than the volume of liquid contained in the measurement chamber during the optical measurement step.

The maximum renewal value may be such that the volume of liquid contained in the measurement chamber and in the collecting conduit in the separation step is at least ten times greater than the volume of liquid contained in the measurement chamber and in the collecting conduit during the optical measurement step.

The method may include a plurality of optical measurement steps, at least one sequence of a separation step and a step of bringing the two measurement surfaces toward one another being executed between two successive optical measurement steps, the thickness of the measurement chamber in the step of bringing the surfaces toward one another being equal to a low value called the renewal value, this being lower than the maximum renewal value and greater than or equal to the measurement value.

On the figures and in the rest of the description, the same references represent identical or similar elements. Additionally, in order to enhance the clarity of the figures, the different elements are not shown to scale. Furthermore, the different embodiments are not mutually exclusive and may be combined with one another. Unless specified otherwise, the terms "substantially", "approximately", and "of the order of" signify a tolerance of 10%.

BRIEF DESCRIPTION OF THE DRAWINGS

Other aspects, objects, advantages and characteristics of the invention will be more readily apparent from a perusal of the following detailed description of preferred embodiments of the invention, provided by way of non-limiting example with reference to the attached drawings, in which:

FIGS. 5A to 5E are schematic views of different variants of an analysis system that is in fluid immersion with a container containing a liquid to be analyzed.

DETAILED DESCRIPTION OF PARTICULAR EMBODIMENTS

Figure 1:
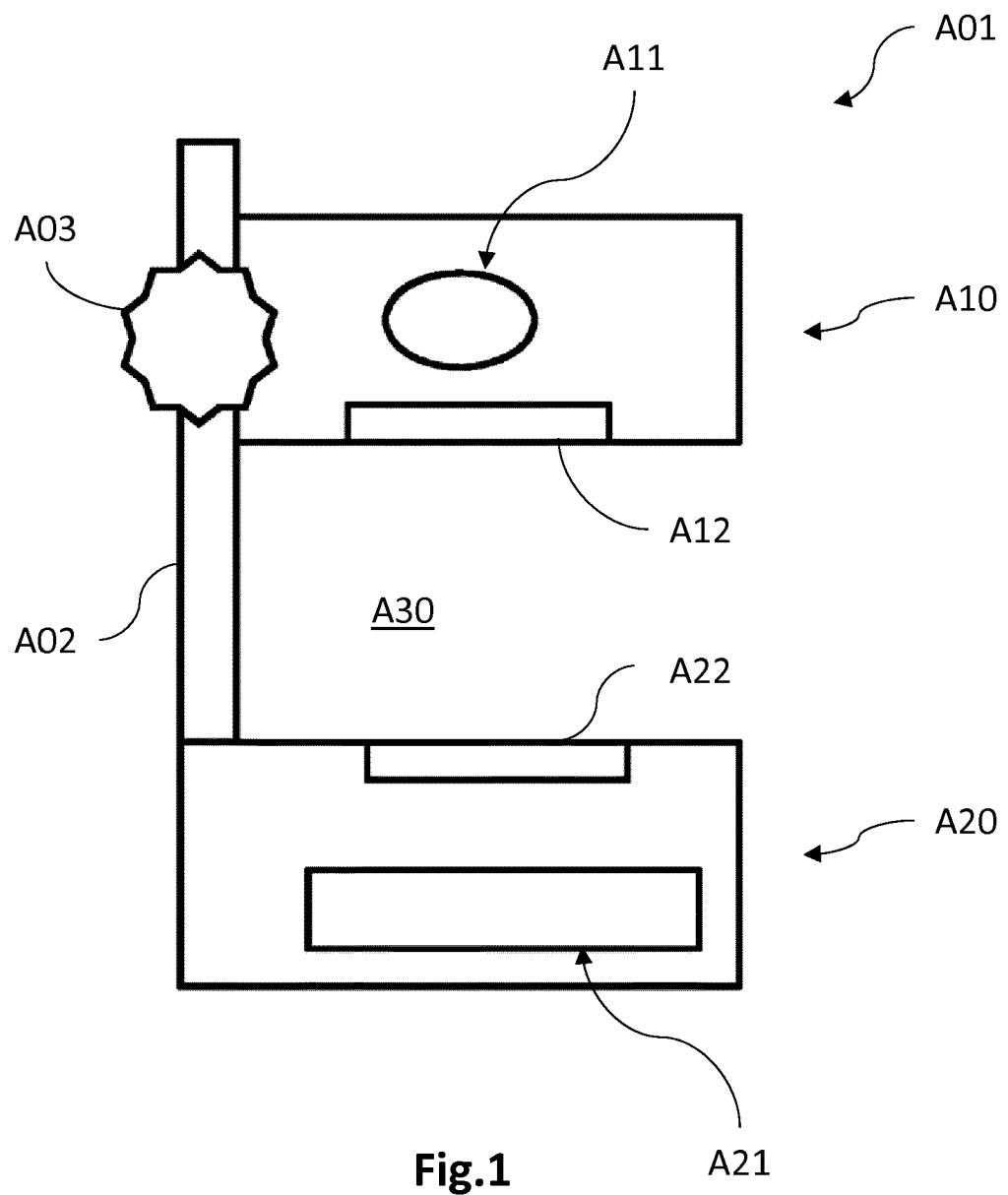
FIG. 1 shows a confinement device.

FIG. 1 shows a device A01 that comprises an immersible part formed by two sealed housings A10, A20, one of which translates relative to the other. The relative spacing between the two sealed housings A10, A20 defines a measurement site A30 that, when the device is immersed in the liquid, receives a portion of the liquid forming the liquid sample to be analyzed.

The first sealed housing A10 comprises a light source A11 positioned facing a transparent window A12, and the second sealed housing A20 comprises a photodetector A21 placed facing a second transparent window A22. The two windows A12, A22 are oriented relative to one another along an optical path defined by the relative arrangement of the light source A11 and the photodetector A21. Thus the device A01 may be used to illuminate the liquid sample present in the measurement site A30 by means of light emitted by the light source A11 and transmitted through the window A12 and to acquire an image of the illuminated sample, or more precisely a diffraction image obtained from the liquid sample, via the photodetector A21. In order to adapt the relative separation between the two transparent windows A12, A22 and thus to fix a desired thickness for the liquid sample, the movable housing A20 is fastened to a bar A02 that may be moved relative to the first housing A10 by means of a hand-wheel A03. Thus, by operating the hand-wheel A03, the separation between the two housings A10, A20, and therefore the thickness of the liquid sample, may be changed.

Figure 2A:
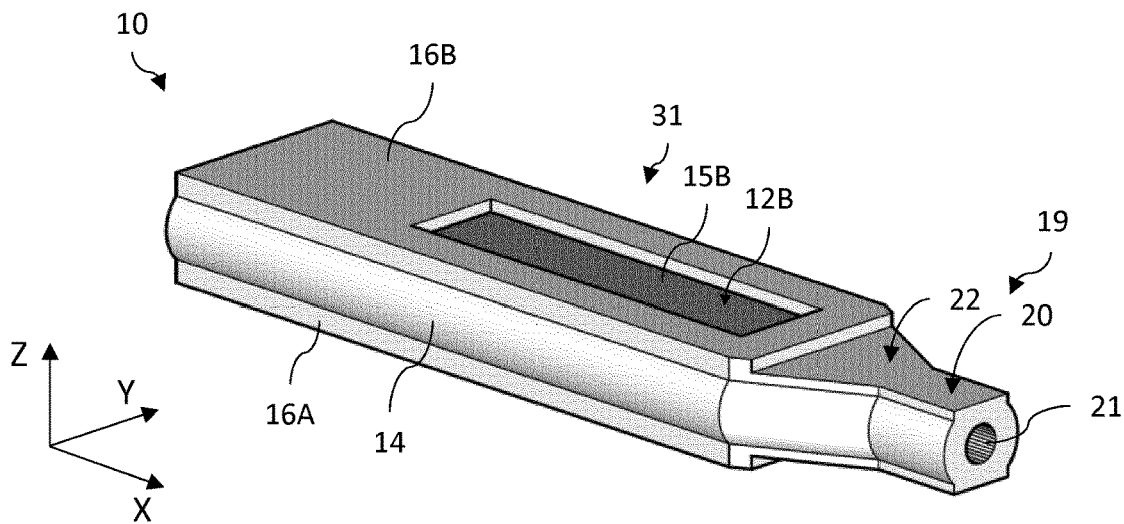
FIGS. 2A, 2B and 2C are schematic views of a confinement device according to a first embodiment, in perspective, in longitudinal section and in cross section, respectively.
Figure 2B:
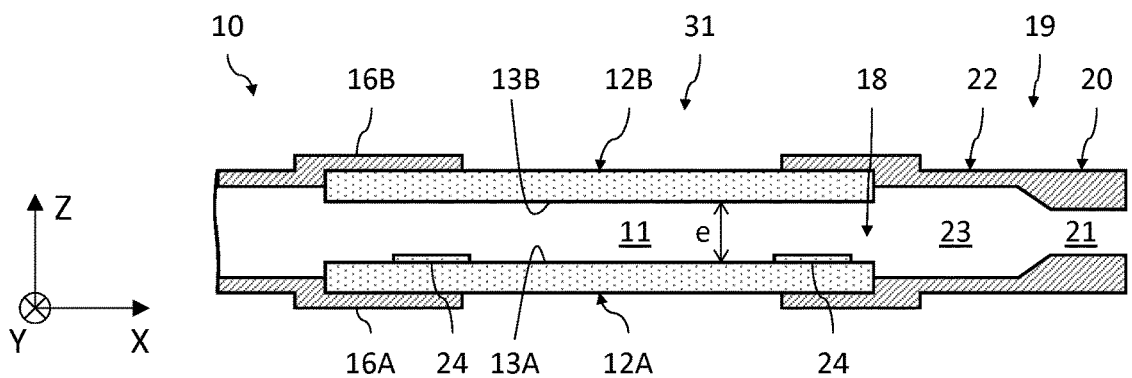
Figure 2C:
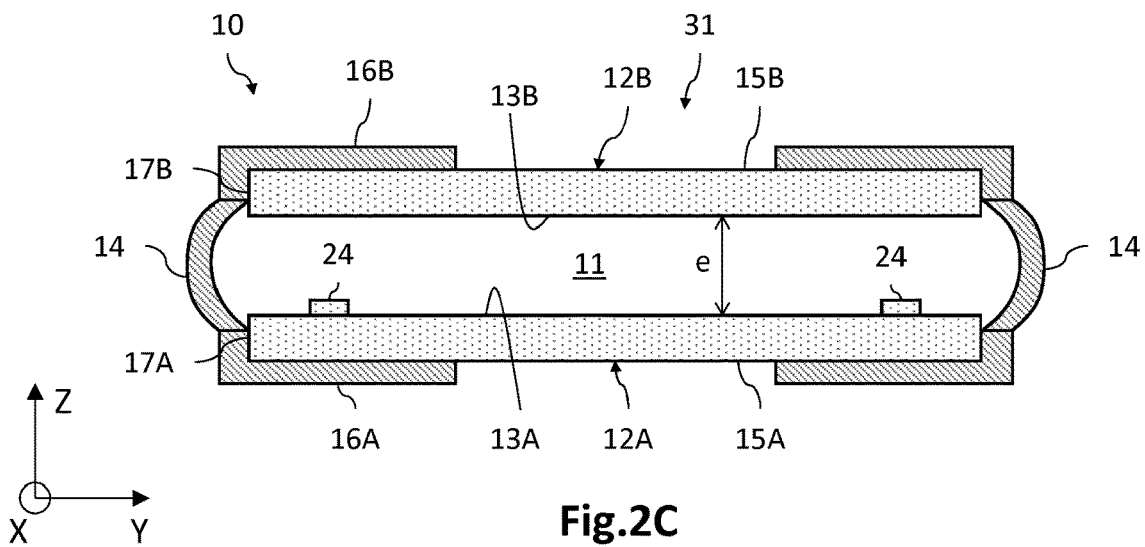

FIGS. 2A, 2B, and 2C are schematic views of a confinement device 10 according to a first embodiment, in perspective, in longitudinal section and in cross section, respectively.

This description relies throughout on a three-dimensional right-angled XYZ reference frame in which the X and Y-axes form a plane parallel to the principal plane of the transparent windows 12A, 12B that delimit the measurement chamber 11 along the thickness dimension of the latter. The Z-axis is oriented substantially orthogonally to the principal plane of the transparent windows 12A, 12B. As a result the separation between two coordinates on the Z-axis indicates the thickness of the measurement chamber 11.

The confinement device 10 includes two measurement surfaces 13A, 13B that are positioned facing one another and connected to one another by a flexible membrane 14 so as to delimit an internal space that forms a measurement chamber 11 capable of receiving a sample to be analyzed.

Each measurement surface 13A, 13B is an inner face of a transparent window 12A, 12B that takes the form of a rigid plate. The measurement surfaces 13A, 13B are arranged substantially parallel to one another and are preferably substantially flat.

Each rigid plate 12A, 12B has a free surface on its outer face 15A, 15B, that is to say a surface not covered by an opaque material, so as to form a measurement area 31 suitable for the transmission of a light beam, called the measurement light beam, emitted by the optical measurement device (not shown).

In some embodiments, the rigid plates 12A, 12B have a substantially rectangular shape in the XY-plane. But they may have other shapes, for example square, polygonal or circular. They also have dimensions, in the XY plane that are on the order of several tens of millimeters to several hundreds of millimeters, for example, in this case, purely for illustration, there exist embodiments with a length of fifty millimeters along the X-axis and a width of between one to twenty millimeters along the Y-axis. Such embodiments can have a thickness, along the Z axis, of the order of a millimeter, that is, for example, between half a millimeter and ten millimeters, for example two millimeters, and that may be substantially constant at all points of the plate or may be smaller in the measurement area 31. The thickness of the rigid plates 12A, 12B may or may not be identical from one rigid plate to another.

Each rigid plate 12A, 12B is made, at least in the measurement area 31, of a material that is transparent to the measurement light beam or to a response light beam. As used herein, a "transparent material" has a transmission rate of the material is greater than or equal to 50%, preferably 75%, or more preferably 90% or above. The transparent material may be sapphire, borosilicate, quartz, polycarbonate or other material, and is advantageously of class VI quality according to the USP (United States Pharmacopeia) convention, thus ensuring that the material of the transparent windows 12A, 12B is compatible with the liquid medium contained in the container.

Each rigid plate 12A, 12B is advantageously formed from a single transparent material or from a stack of more than one transparent material. It may also include a material that is opaque outside the measurement area 31. Or it may be non-transparent outside the measurement area 31.

The confinement device 10 also includes a flexible membrane 14, fastened in a sealed way to the measurement surfaces 13A, 13B, in this case at the edge of each rigid plate 12A, 12B, so as to delimit, together with the measurement surfaces 13A, 13B, the measurement chamber 11. Thus the measurement chamber 11 is delimited along the Z axis of its thickness by the measurement surfaces 13A, 13B, and is delimited laterally by the flexible membrane 14, that is to say in the XY-plane that is substantially orthogonal to the Z axis. The flexible membrane 14 may be substantially peripheral, so that it may surround the measurement chamber 11 in a substantially continuous way in the plane (X, Y), subject to the presence of at least one aperture 18 for the admission and/or discharge of the liquid.

The flexible membrane 14 may have a thickness of the order of a millimeter, for example between half a millimeter and five millimeters, or the order of a millimeter for example. The flexible membrane 14 is made of a thin, sealing material capable of being deformed to allow the translational movement of at least one transparent window relative to the other along the Z-axis. The flexible membrane 14 may be made of silicone, an elastomer such as FFKM (perfluoroelastomer), FKM (fluoroelastomer), EPDM (ethylene propylene diene monomer) or any other material having suitable sealing and flexibility properties. The material of the flexible membrane 14 is also advantageously of quality class VI according to the USP convention.

The flexible membrane 14 is fastened in a sealed way to the measurement surfaces 13A, 13B, and more precisely to the rigid plates 12A, 12B, by means of fastening portions 16A, 16B. Each fastening portion 16A, 16B here covers a part of the outer face 15A, 15B of a rigid plate 12A, 12B, at the edge of the latter, and at least a part of the lateral face 17A, 17B of the rigid plate 12A, 12B. The central part of the outer face 15A, 15B of each rigid plate 12A, 12B, not covered by the fastening portions 16A, 16B, forms the measurement area 31.

The fastening portions 16A, 16B may be made of silicone, an elastomer such as FFKM (perfluoroelastomer), FKM (fluoroelastomer), EPDM (ethylene propylene diene monomer) or any other material having suitable sealing and adhesion properties. The material of the flexible membrane 14 is also advantageously of quality class VI according to the USP convention. Advantageously, the flexible membrane 14 and the fastening portions 16A, 16B may be made in one piece and from the same material. The fastening portions 16A, 16B may be formed by overmolding the rigid plates 12A 12B at their respective edges. They may be fastened to the rigid plates 12A, 12B by means of a sealing adhesive.

Figure 3A:
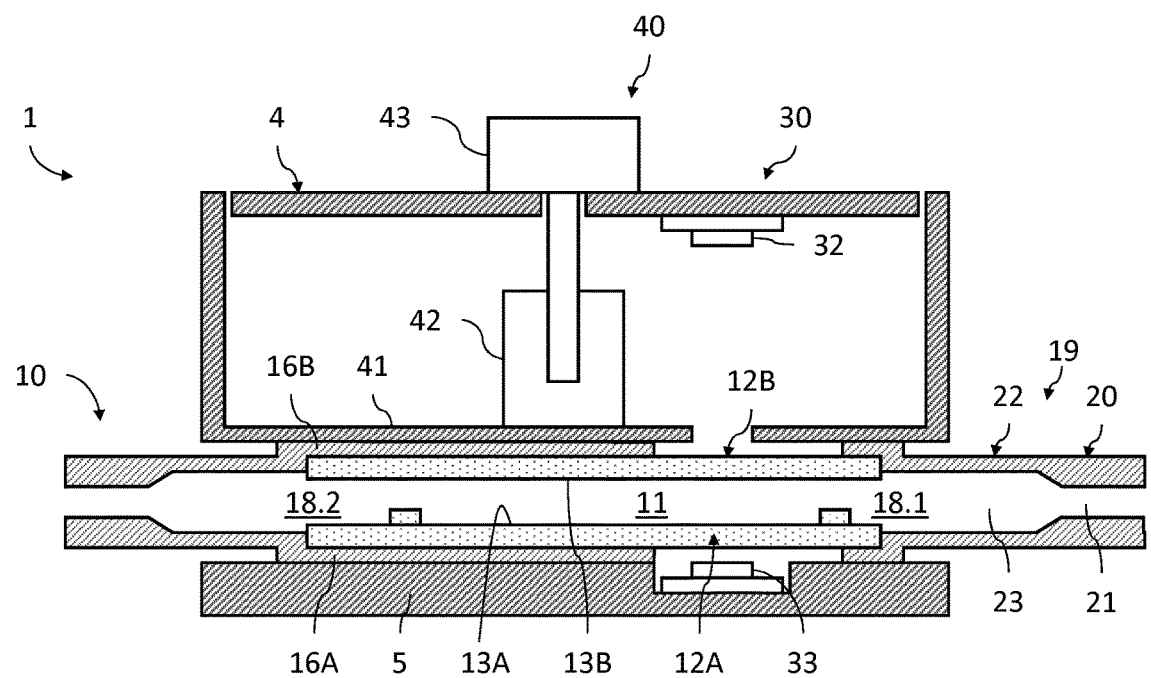
FIGS. 3A and 3B are schematic views of a longitudinal section of an analysis system including a confinement device according to a second embodiment, an optical measurement device and an actuation device.
Figure 3B:
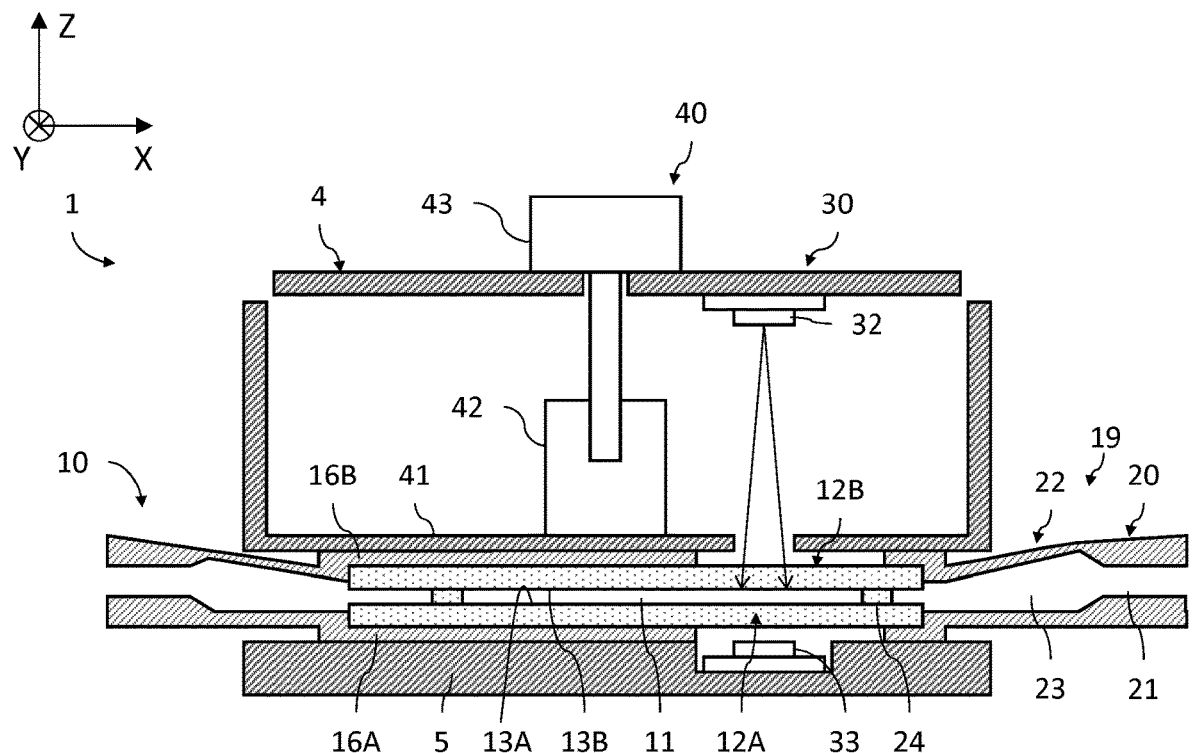

The confinement device 10 includes at least one aperture 18 allowing the introduction and/or discharge of the liquid into and from the measurement chamber 11. This aperture 18 may be delimited by the flexible membrane 14, and is here located in a connecting part 19 connecting the confinement device 10 to a fluid conduit, which is here a collecting tube (not shown) that is intended to be connected to the container containing the liquid to be analyzed. In this example, the confinement device 10 includes a single aperture 18 allowing the alternate entry and exit of the liquid into and from the measurement chamber 11. In an alternative embodiment, as illustrated in FIGS. 3A and 3B, it may include a first aperture 18.1 for introducing the liquid into the chamber and a second aperture 18.2 for discharging the liquid from the chamber.

The confinement device 10 here includes a connecting part 19 intended to provide the mechanical joint between the measurement chamber 11 and the fluid conduit for collection or discharge.

This connecting part 19 includes a fluid connection portion 20 that connects to the collecting or discharge conduit or is made in one piece with this conduit. The fluid connection portion 20 is designed so that its size along the Z-axis does not substantially vary when the measurement surfaces 13A, 13B of the measurement chamber 11 are brought toward, or are separated from, one another. It includes a fluid inlet conduit 21 delimited by a material made in one piece with, and from the same material as, the flexible membrane 14. The transverse dimensions of the material are such that this conduit 21 has an inside diameter the value of which is not substantially modified when the measurement chamber 11 varies in thickness. The inside diameter may be of the order of a millimeter, for example between a millimeter and five millimeters. The thickness of the material surrounding the inlet conduit 21 may be equal to several millimeters. The connecting portion 20 may have a length allowing it to be connected to a collecting tube, for example a length of between several millimeters and several centimeters. In an alternative embodiment, it may have a length such that it forms on its own the collecting or discharge conduit.

The connecting part 19 also includes an intermediate portion 22 providing a fluid connection between the connecting portion 20 and the measurement chamber 11, as well as the mechanical joint between the connecting portion 20, the transverse dimensions of which are substantially constant in the course of the analysis method, and the measurement chamber 11, the thickness of which varies in the course of the analysis method. This intermediate portion 22 includes an intermediate fluid conduit 23 delimited laterally by the flexible membrane 14 and delimited along the Z-axis by the fastening portions 16A, 16B. This intermediate portion 22 can be deformed along the Z-axis as the thickness of the measurement chamber 11 is modified. The intermediate conduit 23 also has a first value of thickness at the end nearer the measurement chamber 11 and a second value of thickness at the end nearer the connection portion 20. In the course of the analysis method, the first value is substantially equal to that of the thickness of the measurement chamber 11 and the second value is substantially constant over time.

The confinement device 10 includes a fluid-collecting conduit that connects to the container. This may be an attached conduit, that is to say a conduit separate from the connecting part and fastened in a sealed, and preferably sterile, way to the fluid connection portion 20. In an alternative embodiment, it may be a conduit made in one piece with, and from the same material as, the connection portion 20. Thus the collecting conduit provides fluid communication between the container and the measurement chamber 11. It has a length that may be of the order of several tens of centimeters, for example twenty centimeters, or more, and an inside dimension of the order of one to several millimeters, for example. It may be made of silicone, an elastomer such as FFKM (perfluoroelastomer), FKM (fluoroelastomer), EPDM (ethylene propylene diene monomer) or any other material having the necessary sealing and flexibility properties, and advantageously being of class VI according to the USP Convention.

The collecting conduit may be mechanically connected to the panel of the container or to a rigid plate part forming the container. It may thus be partially introduced into the container and then assembled onto the panel in a sealed, and preferably sterile, way. The collecting conduit then has a part located inside the container that is continued in a part located outside the container, the latter part being joined to the connection portion 20 of the confinement device 10. In an alternative embodiment, the collecting conduit may be connected to an intermediate tube providing fluid communication with a flexible container, in a sealed, and preferably sterile, way. The connection may be made by means of a sterile connection device such as a heat sealer.

In the first embodiment shown in FIGS. 2A to 2C, the confinement device 10 includes a single collecting conduit. This conduit then also has the function of discharging the liquid contained in the measurement chamber 11. The discharged liquid may be reintroduced into the container, in the case of in-line analysis of the liquid, or may be discharged into a second enclosure, separate from the container, instead of into the container itself. As described below with reference to FIGS. 3A and 3B, the confinement device 10 may include a collecting conduit opening into a first end 18.1 of the measurement chamber 11, and a fluid discharge conduit opening into a second end 18.2 separate from the first end 18.1. In this case, the confinement device 10 includes a second connecting part, identical or similar to the connecting part described above, which provides a fluid connection and mechanical joint between the discharge conduit and the measurement chamber 11.

In this example, the confinement device 10 includes at least one stop member 24 positioned on one and/or both of the measurement surfaces 13A, 13B to provide a stop between these surfaces. Here, two stop members 24 are positioned at the edge of the measurement surface 16A so as not to interfere with the light beam emitted during an optical measurement step. Each stop member 24 has a thickness that defines a relative spacing between the measurement surfaces 13A, 13B, and thus a minimum value, called the measurement value $e_{mes}$, of the thickness of the chamber. It has a thickness of the order of several microns to several hundreds of microns, for example a thickness of between five micrometers and five hundred micrometers, and preferably between ten micrometers and three hundred micrometers, for example twenty micrometers, depending, notably, on the size of any analytes present in the liquid sample. Each stop member 24 may be a pin or a line projecting from the measurement surface 16A, made of a material applied and fastened to the measurement surface 16A, or made in one piece with, and in the same material as, the rigid plate 12A.

In an alternative embodiment, or additionally, the stop may be provided by the actuation device described below, for example by means of stop members limiting the extent of movement of the part or parts causing the measurement surfaces 13A, 13B to be brought toward one another. It may also be provided without any special stop members, but by the precision of the movement of the parts.

Thus the measurement chamber 11 is an internal space of the confinement device 10, delimited along the Z axis by the two measurement surfaces 13A, 13B of the rigid plates 12A, 12B, and in the plane (X, Y) by the flexible membrane 14. The rigidity of the plates 12A, 12B and the flexibility of the membrane 14 are such that a mechanical force applied to at least one of the plates 12A, 12B along the Z axis causes the rigid plates 12A, 12B to move relative to one another without mechanical deformation of the rigid plates 12A, 12B, the measurement surfaces 13A, 13B remaining substantially parallel to one another.

As mentioned above, the thickness of the measurement chamber 11 may have a minimum value $e_{mes}$ called the measurement value, defined for example when the measurement surfaces 13A, 13B bear against one another at the stop members 24. The minimum measurement value may be of the order of several microns to several hundreds of microns, for example approximately twenty micrometers. The volume of the measurement chamber 11 is then defined by the transverse dimensions in the XY-plane, for example the length L and the width 1, and by the minimum measurement thickness $e_{mes}$.

When the two measurement surfaces 13A, 13B are separated from one another, the thickness of the measurement chamber 11 may then have a maximum value $e_2$, called the renewal value. The thickness of the measurement chamber 11 may also have an intermediate value, called the low liquid renewal value $e_1$, in which the two surfaces 13A, 13B have been brought toward one another. The low value $e_1$ is then less than $e_2$ and greater than or equal to $e_{mes}$.

Preferably, the maximum renewal thickness $e_2$ is such that the liquid present in the measurement chamber 11 is substantially renewed between two successive steps of optical measurement, in which the measurement chamber 11 has the minimum measurement thickness $e_{mes}$. In other words, the high thickness $e_2$ is such that the volume of the measurement chamber 11 is greater than or equal to at least ten times, or at least fifty times, or at least a hundred times the volume of the measurement chamber 11 in the measurement configuration. Thus, if the measurement thickness is of the order of twenty micrometers and 99% renewal of the liquid is desired, the high renewal value $e_2$ will be equal to or greater than two millimeters.

Preferably, the maximum renewal thickness $e_2$ is such that the liquid present in the measurement chamber 11, but also present in the collecting conduit connecting the measurement chamber 11 to the container, is substantially renewed between two successive optical measurement steps. In other words, it is advantageous for this value $e_2$ to be such that the volume of the measurement chamber 11 and the volume of the collecting tube in this configuration is greater than or equal to at least ten times, or at least fifty times, or at least a hundred times the volume of the measurement chamber 11 and the collecting conduit in the measurement configuration. Thus, if the measurement chamber 11 has a length L of fifty millimeters and a width one of twenty millimeters, and if the collecting conduit has an inside diameter of one millimeter with a length of two-hundred millimeters, the measurement thickness $e_{mes}$ being of the order of twenty micrometers, a high renewal value $e_2$ equal to five millimeters results in 97% renewal of the liquid present in the measurement chamber 11 and in the collecting conduit.

Thus the confinement device 10, when connected to the container by the collecting conduit, may receive in the measurement chamber 11 a sample of the liquid contained in the container. Thus any direct immersion of the measurement chamber 11 in the container is limited, as are the risks of pollution or contamination of the liquid present in the container.

The measurement chamber 11 being delimited by the transparent measurement surfaces 13A, 13B, and by the flexible membrane 14 which interconnects the measurement surfaces 13A, 13B in a sealed way, makes it possible to vary the thickness of the measurement chamber 11 in order to make an optical measurement through the transparent measurement surfaces 13A, 13B and to renew the liquid contained in the measurement chamber 11. By varying the thickness of the measurement chamber 11 it is possible to limit the risks of obstruction of the measurement chamber 11 by the analytes of interest while also limiting the risks of appearance of gas bubbles in the measurement chamber 11, which may interfere with the analysis.

The thickness of the measurement chamber 11 may be less than or equal to five hundred micrometers, or less than or equal to three hundred micrometers, for example equal to fifty micrometers, twenty micrometers or less. The thickness of the measurement chamber 11 may then be of the same order of magnitude as the average size of the analytes of interest, of the order of several tens of microns for example, enabling a particularly precise analysis of the properties of the liquid sample to be conducted.

Advantageously, the confinement device 10 does not include any mixing chamber containing reagents intended to react with the analytes present in the liquid to be analyzed. As mentioned above, optical measurement by lens-free imaging may be carried out. In this way, any pollution of the liquid or modification of its physical and/or chemical properties is avoided, thus allowing the in-line analysis of the liquid in the container; that is to say, the liquid introduced into the measurement chamber 11 may subsequently be re-injected into the initial container.

FIGS. 3A and 3B are views of a longitudinal section of an analysis system including a confinement device 10 according to a second embodiment, an actuation device 40 capable of varying the thickness of the measurement chamber 11, and an optical measurement device. The flow device is not shown. FIG. 3A shows the analysis system 1 in a liquid renewal configuration, and FIG. 3B shows a measurement configuration of the analysis system 1 in which the measurement surfaces 13A, 13B bear against one another at the stop members 24.

In this case, the confinement device 10 is distinguished from the first embodiment by having a first aperture 18.1 for the introduction of the liquid into the measurement chamber 11 from a collecting conduit connected to the container and a second aperture 18.2 for the discharge of the liquid from the measurement chamber 11. This second aperture 18.2 may be connected to a discharge conduit, and the latter may or may not be connected to the container. In this example, the two apertures are opposed to one another along the measurement chamber 11.

An optical measurement device 30 is positioned relative to the confinement device 10 so that the liquid sample present in the measurement chamber 11 can be illuminated and the radiation emitted from the sample in response to the exciting radiation can be detected. It includes a light source 32 positioned facing the transparent window 12B along the Z-axis. The light source 32 is therefore positioned so that it can illuminate the part of the measurement chamber 11 delimited by the two measurement surfaces 13A, 13B, in a direction of illumination that is parallel to the Z-axis. The light source 32 may be one or more light-emitting diodes or a laser diode positioned for example on a printed circuit board providing the electrical connection of the light source 32.

A diffuser and a diaphragm may be placed downstream of the light source 32 in the direction of illumination. The diffuser is capable of shaping the light beam emitted by the light source 32, in order, notably, to escape from the constraints of positioning the light source 32 relative to the diaphragm. In other words, the use of such a diffuser may make it possible to use a light source 32 that is slightly off-center relative to the opening in the diaphragm. The diffuser may be of the type called a "Light Shaping Diffuser", marketed by the LUMINIT Corporation. A cavity separating the light source 32 and the transparent window 12B allows the transmission of the light radiation emitted by the light source in an approximately absorption-free way. This cavity makes it possible to move the light source to the desired distance from the measurement chamber 11, by several centimeters for example, five centimeters for example, notably when a lens-free imaging technique is used.

The optical measurement device 30 includes a photodetector 33 positioned behind the transparent window 12A in the direction of illumination. The photodetector 33 is capable of receiving light beams emitted from the liquid sample. These beams which are incident on the photodetector 33 may be emitted by the liquid sample in response to illumination by a light source 32 and/or may be part of the illumination beams which are transmitted by the liquid sample and which are possibly refracted or diffracted. The detected beams may be in a spectral range covering the infrared and/or visible and/or ultraviolet. The photodetector 33 may be of the CCD (for Charge Coupled Device) type or a sensor of the CMOS (for Complementary Metal-Oxide Semiconductor) type, and is advantageously of the array type in order to acquire an image of the liquid sample.

The optical measurement device 30 may be capable of making an optical measurement according to what is known as a lens-free imaging technique. This is the case, notably, when the analytes to be detected in the liquid sample are diffracting objects relative to the emission wavelength of the light source 32. For this purpose, the light source 32 is chosen so as to emit spatially coherent illumination beams. It may be, for example, a laser diode, of the semiconductor type for example, or a light-emitting diode equipped with the diaphragm for increasing the spatial coherence of the emitted radiation, or a light-emitting diode the dimensions of which are small enough to avoid the use of a diaphragm, for example one in which the diameter of the diode is less than one tenth of the distance between the diode and the measurement site. The photodetector 33 is of the array type, so that it can acquire images of the radiation transmitted and/or diffracted by the analytes present in the liquid sample. It is placed at a distance from the measurement surface 12A which is advantageously less than or equal to one centimeter, for example a distance of between a hundred micrometers and several millimeters. The small distance between the measurement chamber 11 and the photodetector 33 makes it possible to limit the interference phenomena between the diffraction patterns when the measurement chamber 11 is illuminated. It is possible to avoid the use of a magnifying lens placed between the second measurement surface and the photodetector. A network of micro-lenses, each placed in front of one pixel of the photodetector, may be provided to improve the optical collection of the photodetector, without thereby providing a magnification function. A technique for measuring and processing the diffraction images acquired by the photodetector as described in patent application WO2015/011096 may be used in order to discriminate living cells from dead ones.

The analysis system 1 is also electrically connected to a processing unit (not shown) for processing the measured data. The processing unit may be connected to a display screen for the display of information to the user. Conventionally, the processing unit includes a processor and a memory capable of storing and executing software for processing the measured data.

An actuation device 40 is provided to produce the controlled translational movement of the transparent windows 12A, 12B relative to one another along the Z-axis. In this example, the actuation device 40 comprises a casing 4 in which the confinement device 10 is engaged, a movement member 41, 42, which in this case is capable of moving the measurement surface 12B along the Z axis, and an actuator 43 capable of moving the movement member 41, 42 to vary the thickness of the measurement chamber 11.

In this example, the movement member 41, 42 includes a bearing plate 41 that is rigid and movable in translation along the Z-axis and that is fastened\to the transparent window 12B by the fastening portion 16B. Additionally, the transparent window 12A rests on a support 5 of the casing 4. The movement member also includes a bearing portion 42 fastened to the bearing plate 41 that may be moved in translation along the Z-axis by an actuator 43, in this case an endless screw coupled to a rotary motor and assembled onto the casing 4. Thus the translation of the bearing plate 41 along the Z-axis causes the translation along the Z-axis of the measurement surface 12B, and therefore the variation of the thickness of the measurement chamber 11.

As mentioned above, in an alternative embodiment or in addition to the stop members located in the measurement chamber 11, the minimum measurement thickness $e_{mes}$ of the measurement chamber 11 may be obtained by means of at least one stop member limiting the movement of the plate of the movement member. It may also be obtained without any special stop member, but by the precision of the travel of the actuator or of the movement member.

Evidently, other movement devices may be suitable. Thus, the movement device may comprise a hydraulic actuator such as a pneumatic actuator. The movable measurement surface is then assembled onto a pneumatic actuator, or more precisely onto the rod of the actuator piston. The operation of the actuator causes the measurement surface 13B to move so as to provide the desired thickness of the measurement chamber 11; thus the measurement surfaces 13A, 13B may be placed in the different configurations in which they are brought toward one another or separated. According to another example, the actuation device may be operated electromagnetically. Thus, the actuation device may include an electromagnetic member, for example a linear member, such as an electromagnet. More precisely, the movable measurement surface 13B is assembled onto the movable armature of the electromagnet. At rest, that is to say when the electromagnet is not supplied with electricity, the movable measurement surface 13B may be in a separated position, for example by means of the application of a return force provided by resilient means, for example a spring. When the electromagnet is supplied with power, the magnetic field that is generated causes the movement of the movable armature and therefore of the movable measurement surface from a separated position to a position where they are brought toward one another. Alternatively, the movable measurement surface may be in a position of being brought toward the other surface when at rest, and may move to the separated position when the electromagnet is supplied with electricity. Other examples of electromagnetic movement devices may be used, such as single-winding rotary actuators that may or may not be associated with a gear mechanism, a torque motor, or an electro-dynamic actuator.

The analysis system 1 also includes a flow device for the liquid, capable of causing the liquid to be introduced into the measurement chamber 11 from the container, and to be discharged from the measurement chamber 11. The flow device may include a pump of the piston, membrane, or other type, possibly associated with one or more check valves. The pump may be formed by the confinement device 10, and more particularly by the measurement chamber 11, which, when its thickness varies because of the actuating device, may cause the liquid to be moved by pumping. This may be the case when the confinement device 10 includes only a single collecting and discharge conduit. This may also be the case when it includes a first collecting conduit and a second discharge conduit connected to the measurement chamber 11, in which case the confinement device 10 may preferably include two check valves, thus providing the circulation of the liquid in a single direction.

An example of the operation of the confinement device 10 in the context of a method for analyzing a liquid sample will now be described with reference to FIGS. 4A to 4E. The figures are schematic views of a cross section in the plane (Y,Z) of the confinement device 10 at the position of the measurement chamber 11.

A liquid sample is introduced into the measurement chamber 11 from the container through the collecting conduit, the latter having been connected to the container beforehand.

Figure 4A:
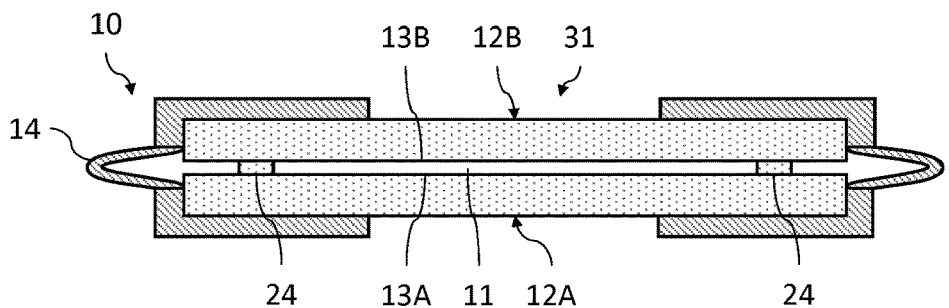
FIGS. 4A to 4E are schematic views of a cross section of the confinement device according to the first or second embodiment, for different steps of an example of a method for analyzing a liquid sample.

With reference to FIG. 4A, an optical measurement of at least one property relating to the liquid sample is made. The thickness of the measurement chamber 11 is equal to the minimum measurement value $e_{mes}$, for example twenty micrometers. For this purpose, the measurement surfaces 13A, 13B are brought toward one another so that they bear against one another at the stop members 24. The light source 32 then emits light that is transmitted through the movable window and illuminates the liquid sample between the two measurement surfaces 13A, 13B in the measurement area 31.

The photodetector 33 acquires light emitted from the illuminated liquid sample, for example incident light that has been diffracted by the analytes and that forms diffraction patterns. The minimum measurement value may be adjusted on the basis, notably, of the concentration of the analytes present in the liquid sample, so as to optimize the precision, resolution and/or robustness of the optical technique used.

A plurality of successive optical measurement steps may be executed to provide real-time monitoring of the liquid and of the analytes present in the container. In order to ensure that the liquid sample, and advantageously the liquid contained in the collecting conduit, is correctly renewed between two successive steps of optical measurement, and, notably, in order to prevent the obstruction of the measurement chamber 11 by analytes present in the liquid, it is useful to execute at least one step of renewal of the liquid sample after a step of optical measurement. For this purpose, between two positions of the surfaces 13A, 13B with the thickness $e_{min}$ in which they are brought toward one another, the surfaces 13A, 13B are separated to a separated renewal position for which the thickness has been increased to the renewal value $e_2$.

Figure 4B:
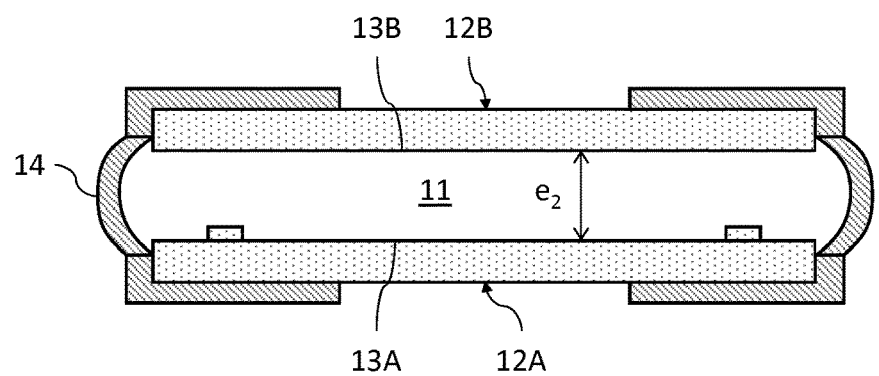

With reference to FIG. 4B, the measurement surfaces 13A, 13B are separated from one another so as to occupy a separated position, called the renewal position. The thickness of the measurement chamber 11 is then greater than that at the measurement thickness, and is preferably greater than or equal to several millimeters, for example equal to one millimeter, three millimeters or five millimeters.

This step of separating the measurement surfaces 13A, 13B may last from several seconds to several tens of minutes, or longer. As a result of this step, the liquid present in the measurement chamber 11, and advantageously in the collecting conduit, is substantially entirely renewed.

A step of optical measurement may then be executed. Such a step includes bringing the measurement surfaces 13A and 13B toward one another so that the thickness has the value $e_{min}$. It is advantageous for a step of bringing the measurement surfaces 13A, 13B toward one another, followed by a new step of separating the measurement surfaces 13A, 13B, to be executed before the next step of optical measurement.

Figure 4C:
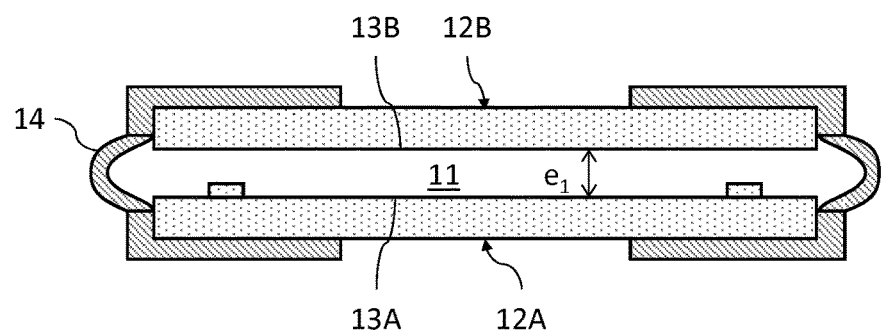

With reference to FIG. 4C, the measurement surfaces 13A, 13B are brought toward one another so that the thickness of the measurement chamber 11 is equal to the low renewal value $e_1$. This low value is greater than or equal to the measurement value, and less than the maximum renewal value. In some practices, this low renewal value is on order of five hundred micrometers. The liquid initially present in the measurement chamber 11 may then be reintroduced into the container, in the case of in-line analysis.

Figure 4D:
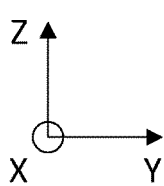
Figure 4D:
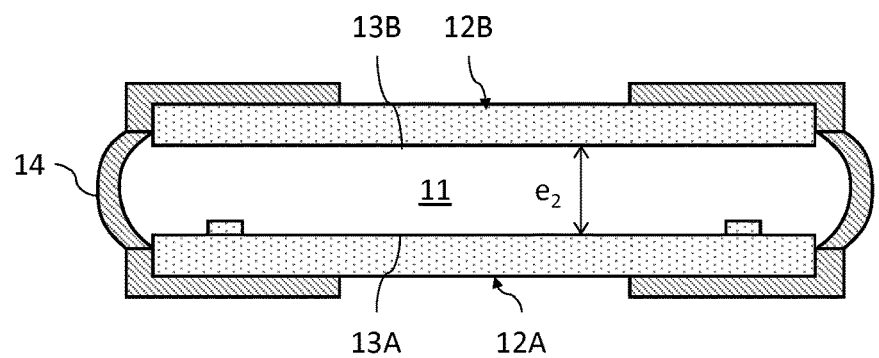

With reference to FIG. 4D, a new step of separating the measurement surfaces 13A, 13B is executed. The thickness of the measurement chamber 11 then has a value greater than the low renewal value $e_1$, for example the maximum value $e_2$. Thus there is a new renewal of the liquid present in the confinement device.

Figure 4E:
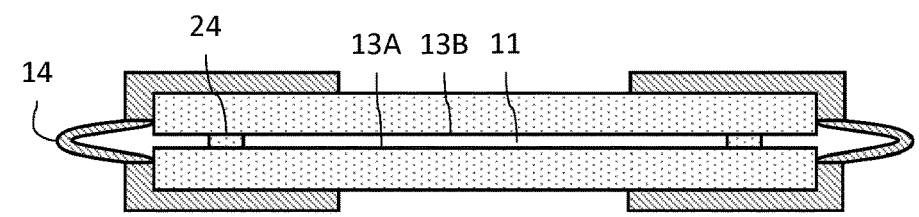

With reference to FIG. 4E, a new step of optical measurement is executed, during which the measurement surfaces 13A, 13B are brought toward one another so that the thickness of the measurement site has the minimum renewal value $e_{mes}$.

Thus a plurality of optical measurement steps are executed, and, between two successive measurement steps, at least one step of separating the measurement surfaces 13A, 13B to a maximum renewal thickness is executed, followed by a step of bringing the measurement surfaces toward one another to a minimum measurement thickness $e_{min}$, and advantageously a plurality of steps of separating the measurement surfaces 13A, 13B and bringing them toward one another are executed, so as to ensure the correct renewal of the liquid present in the measurement chamber 11, and preferably also the renewal of the liquid present in the collecting tube. This also prevents the sedimentation and clogging of the measurement chamber 11 and the collecting tube by the analytes of interest.

FIGS. 5A to 5E show schematically different embodiments of the analysis system 1 connected to the container 3. FIGS. 5A to 5C show examples in which the analysis system 1 includes a recirculation loop, and FIGS. 5D and 5E show examples in which the analysis system 1 includes a single conduit 2.1 for collecting and discharging the liquid.

With reference to FIG. 5A, the analysis system 1 forms a recirculation loop for the container 3. Thus the confinement device 10 includes a first collecting conduit 2.1 and a second discharge conduit 2.2, these conduits being connected mechanically to the container 3 in a sealed way and being partially introduced into the latter. The liquid flows within this recirculation loop from the collecting tube 2.1 toward the discharge tube 2.2, passing through the measurement chamber of the confinement device 10. For this purpose, two check valves 51.1, 51.2 are positioned in series with the confinement device 10 and more particularly with the measurement chamber, one on each side of the latter. The confinement device 10 associated with the actuation device and the two check valves 51.1, 51.2 form the flow device. Thus, separating the transparent windows of the measurement chamber, and consequently increasing the thickness of the measurement chamber, causes the liquid to flow in the conduit 2.1 from the container 3 into the measurement chamber, and bringing the transparent windows toward one another, and consequently decreasing the thickness of the measurement chamber, causes the liquid to be discharged from the measurement chamber into the conduit 2.2, and all the way into the container 3. Therefore, actuating the measurement chamber causes the liquid to be pumped and to flow in the conduit 2.1 into the measurement chamber, and into the conduit 2.2, before being re-injected into the container 3.

With reference to FIG. 5B, the analysis system 1 again forms a recirculation loop, through the fluid connection of the collecting conduit 2.1, the confinement device 10, and the discharge conduit 2.2. Here the flow device includes a hydraulic pump 52 with a single direction of flow, connected in series with the confinement device 10. Thus, actuating the pump 52 causes the liquid to flow in the conduit 2.1 and then in the conduit 2.2, while passing through the measurement chamber, before being re-injected into the container 3. In this example, the pump 52 is preferably actuated when the thickness of the measurement chamber is greater than the minimum measurement value, thus allowing the liquid to flow within the chamber.

With reference to FIG. 5C, the analysis system 1 is similar to that described in FIG. 5B, and differs therefrom in that it includes a bypass valve 53 connected in parallel with the confinement device 10. A bypass valve is a valve that has a threshold for switching between its open state and its closed state. In this configuration, the pump 52 may be actuated permanently, notably when an optical measurement step is executed. More precisely, when an optical measurement step is executed, the measurement chamber has the minimum optical measurement thickness $e_{mes}$, creating a high local hydraulic resistance that then causes the bypass valve 53 to open. Thus, in a measurement step, the liquid does not pass through the measurement chamber, but continues to flow, passing through the bypass valve 53. Between two successive optical measurement steps, the measurement chamber has a thickness greater than the minimum measurement value, creating a lower local hydraulic resistance that then causes the bypass valve 53 to close. The liquid can then pass through the measurement chamber instead of the bypass valve 53. The liquid is then continually renewed in the conduits 2.1 and 2.2.

With reference to FIG. 5D, the analysis system 1 includes a single tube 2.1, which serves both for the collecting the liquid from the container 3 and introducing it into the measurement chamber 11, and for discharging the liquid from the measurement chamber 11 so that it can be re-injected into the container 3. The collecting and discharge tube 2.1 is connected to an aperture for the entry and exit of the liquid into and from the confinement device 10. In this case, the confinement device includes a second aperture for the fluid connection of the measurement chamber 11 to a pocket 54, preferably sealed, for receiving gas bubbles. In this case, the flow device is formed solely by the confinement device 10 associated with the actuation device. Thus, separating the transparent windows causes the liquid to be sucked from the container 3 into the measurement chamber, and bringing the transparent windows toward one another causes the liquid to be discharged from the chamber and to be re-injected into the container 3. The pocket 54 is optional, and serves to receive any gas bubbles. When the windows of the confinement device 10 are brought toward one another, the pocket 54 may be compressed or compacted so that the gas present is discharged from the pocket, via the conduit 2.1 for example.

In this example, the confinement device is placed above the conduit 2.1 along the gravitational axis. In an alternative embodiment, it may be turned over so that the conduit 2.1 is placed above the confinement device. In this example, the pocket 54 may be omitted, since any gas bubbles that may be present in the measurement chamber are discharged naturally during the pumping phases (the phases in which the transparent windows of the measurement chamber are separated and brought toward one another).

With reference to FIG. 5E, the analysis system 1 differs from that described in FIG. 5D essentially in that the flow device includes a vacuum pump 55 in fluid connection with the measurement chamber, together with a pressurized gas reservoir 57 connected in series with a controlled-opening check valve 56. The vacuum pump 55 is connected in parallel with the reservoir 57 and the valve 56, and in fluid communication with the end of the measurement chamber opposed to the conduit 2.1. Actuating the vacuum pump 55 causes the liquid to be sucked from the container 3 and introduced into the measurement chamber. An optical measurement step may be executed. The vacuum pump 55 is then inactivated and the valve 56 is opened. The pressurized gas causes the liquid to be discharged from the measurement chamber. By alternating these steps, the liquid can be renewed in the conduit 2.1 and the measurement chamber. It is possible to ensure the sterility of the analysis system 1, notably at the vacuum pump 55, in relation to the environment may be ensured by using a filter having an average pore size of 0.22 millimeters or less.

Particular embodiments have now been described. A range of embodiments and modifications will be apparent to those skilled in the art. As a general rule, the confinement device 10 may be placed above or below the end of the collecting tube 2.1 located in the container 3.

A light source located on the side of the movable transparent window motive 12B and a photodetector located on the side of the fixed transparent window 12A have also been described. Alternatively, the light source may be located on the side of the fixed transparent window motive 12A and the photodetector may be located on the side of the movable transparent window 12B.

Alternatively or in addition to the embodiments described above, the transparent window 12A may be movable relative to the transparent window 12B, in which case the latter is either movable or fixed relative to the casing 4. In this case, the actuation device 40 also includes supplementary movement elements, similar or identical to the elements 40, 41, 42 described above.

Finally, the different embodiments shown in FIGS. 5A-5E are described for illustrative purposes only. Other embodiments of the flow device are possible, notably as regards the number and arrangement of the various hydraulic elements such as the valves and pumps.

Having described the invention, and a preferred embodiment thereof, what we claim as new and secured by Letters Patent is:

1. An apparatus comprising a confinement device, an optical measurement device, a flow device, a collecting conduit, and an actuation device, wherein said confinement device comprises a measurement chamber, optically transparent first and second measurement surfaces that face each other across a distance that defines a thickness of said measurement chamber, a flexible membrane that forms a seal with said first and second measurement surfaces to laterally delimit said measurement chamber, and first and second rigid plates that form said first and second measurement surfaces respectively, wherein fastening portions fasten said membrane to edges of said rigid plates, wherein said collecting conduit is in fluid communication with said measurement chamber such that when said collecting conduit is sealed with a container, a connection is established that permits a liquid sample to be collected from said container, wherein said optical measurement device is configured to emit light towards said measurement chamber and to detect light that has been transmitted through said measurement chamber, wherein said flow device causes liquid to flow through said collecting conduit between said container and said measurement chamber, wherein said actuation device causes relative motion between said measurement surfaces thus causing variation in said thickness, wherein a renewal value defines a maximum value of said thickness, and wherein a measurement value defines a minimum value of said thickness.

2. The apparatus of claim 1, wherein said optical measurement device comprises a light source and a photodetector, wherein said light source faces said first measurement surface and said photodetector faces said second measurement surface, wherein said light source is positioned at a distance greater than or equal to one centimeter from said first measurement surface.

3. The apparatus of claim 1, wherein said optical measurement device comprises a light source and a photodetector, wherein said light source faces said first measurement surface and said photodetector faces said second measurement surface, wherein said light source is positioned at a distance of less than one centimeter from said second measurement surface.

4. The apparatus of claim 1, wherein said actuation device comprises a movement member and an actuator, wherein said movement member is configured for moving at least one of said measurement surfaces so as to change a distance between said measurement surfaces, wherein said actuator is configured to move said movement member so as to vary said thickness of said measurement chamber.

5. The apparatus of claim 4, further comprising a stop member that defines said measurement value, said measurement value being no greater than five hundred micrometers, wherein said stop member is positioned on at least one of said first and second measurement surfaces.

6. The apparatus of claim 1, further comprising a stop member that defines a minimum value of said thickness, said minimum value being no greater than five hundred micrometers, wherein said stop member is positioned on said actuation device.

7. The apparatus of claim 1, wherein said flow device comprises a confinement device associated with said actuation device, wherein increasing said thickness causes liquid to flow into from said container, through said collecting conduit, and into said measurement chamber.

8. The apparatus of claim 1, wherein said fastening portions fasten said rigid plates at outer faces thereof, said outer faces being opposite to said measurement surfaces.

9. The apparatus of claim 1, wherein said fastening portions fasten said rigid plates at lateral faces thereof.

10. The apparatus of claim 1, wherein said fastening portions and said flexible membrane are made in one piece and from said the same material.

11. The apparatus of claim 1, wherein said confinement device comprises a connecting part that comprises a fluid connection portion that includes an inlet conduit that connects to said collecting conduit and that has transverse dimensions that are substantially constant during a variation of said thickness, wherein an intermediate portion provides a fluid connection and a mechanical joint between said inlet conduit and said measurement chamber.

12. A method comprising using an analysis system to analyze a liquid sample, wherein using said analysis system comprises introducing a liquid sample from a container into a measurement chamber of said analysis system, wherein first and second rigid plates form optically transparent first and second measurement surfaces that face each other across a distance that defines a thickness of said measurement chamber, wherein fastening portions fasten a membrane to edges of said rigid plates, said membrane being a flexible membrane that forms a seal with said first and second measurement surfaces to laterally delimit sad measurement chamber, optically measuring a property relating to said sample, causing said measurement chamber to have a thickness equal to a measurement value, said measurement value being a minimum value of said thickness of said measurement chamber, and separating said measurement surfaces so as to permit renewal of liquid in said measurement chamber, wherein separating said measurement surfaces comprises causing said measurement surfaces to be separated by a thickness that is equal to a renewal value, said renewal value being a maximum value of said separation.

13. The method of claim 12, further comprising executing a plurality of successive measurement steps, wherein at least one sequence of a separation step followed by a step of bringing said two measurement surfaces toward one another is executed between two successive optical measurement steps so that said thickness increases from said measurement value to at least said renewal value and then decreases to said measurement value.

14. The method of claim 12, wherein said renewal value is such that a volume of liquid contained in a space in said separation step is at least ten times greater than a volume of liquid contained in said space while optically measuring said property, wherein said space is said measurement chamber.

15. The method of claim 12, wherein said renewal value is such that a volume of liquid contained in a space in said separation step is at least ten times greater than a volume of said liquid contained in said space while optically measuring said property, wherein said space is the union of said measurement chamber and a said collecting conduit.

16. The method of claim 15, further comprising carrying out additional optical measurement steps and, between two successive optical measurement steps, bringing said surfaces toward one another and causing a separation between said surfaces to equal a value that is between said measurement value and said renewal value.

* * * * *